US009158092B2

(12) United States Patent
Izuhara et al.

(10) Patent No.: US 9,158,092 B2
(45) Date of Patent: Oct. 13, 2015

(54) ZOOM LENS SYSTEM, INTERCHANGEABLE LENS APPARATUS AND CAMERA SYSTEM

(71) Applicant: Panasonic Corporation, Osaka (JP)

(72) Inventors: Isamu Izuhara, Osaka (JP); Kyoichi Miyazaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/157,900

(22) Filed: Jan. 17, 2014

(65) Prior Publication Data

US 2014/0132830 A1 May 15, 2014

Related U.S. Application Data

(63) Continuation of application No. PCT/JP2012/005101, filed on Aug. 10, 2012.

(30) Foreign Application Priority Data

Aug. 25, 2011 (JP) .................................. 2011-184165

(51) Int. Cl.
G02B 15/14 (2006.01)
G02B 9/08 (2006.01)
(Continued)

(52) U.S. Cl.
CPC .............. *G02B 13/001* (2013.01); *G02B 15/20* (2013.01); *H04N 5/2254* (2013.01); *G02B 3/04* (2013.01); *G02B 5/005* (2013.01); *G02B 9/60* (2013.01); *G02B 9/62* (2013.01); *G02B 13/009* (2013.01); *G02B 13/0015* (2013.01); *G02B 13/0045* (2013.01); *G02B 13/18* (2013.01); *G02B 15/14* (2013.01); *G02B 15/167* (2013.01)

(58) Field of Classification Search
CPC ........ G02B 13/0045; G02B 9/62; G02B 9/60; G02B 13/18; G02B 13/0015; G02B 13/009; G02B 3/04; G02B 15/14; G02B 15/167; G02B 5/005
USPC ......... 359/683–686, 713, 714, 756–758, 740, 359/763, 764
See application file for complete search history.

(56) References Cited

U.S. PATENT DOCUMENTS 4,948,234 A 8/1990 Mihara
4,995,707 A 2/1991 Hashimoto
(Continued)

FOREIGN PATENT DOCUMENTS

JP 63-049719 3/1988
JP 63-169611 7/1988
(Continued)

OTHER PUBLICATIONS

International Search Report issued Oct. 2, 2012 in International (PCT) Application No. PCT/JP2012/005101.

Primary Examiner — Evelyn A Lester
(74) Attorney, Agent, or Firm — Wenderoth, Lind & Ponack, L.L.P.

(57) ABSTRACT

A zoom lens system comprising a plurality of lens units, wherein a lens unit located closest to an object side and a lens unit located closest to an image side are fixed with respect to an image surface in zooming from a wide-angle limit to a telephoto limit at a time of image taking, and at least three lens units among all the lens units are moving lens units that move along an optical axis in the zooming, at least one lens unit among the moving lens units is a focusing lens unit that moves along the optical axis in focusing from an infinity in-focus condition to a close-object in-focus condition, and the following condition: $\Sigma(Tn)/H \leq 2.1$ ($\Sigma(Tn)$: the total of axial thicknesses of all the moving lens units, H: the maximum image height) is satisfied.

12 Claims, 9 Drawing Sheets

(51) Int. Cl.
*G02B 9/62* (2006.01)
*G02B 13/00* (2006.01)
*G02B 15/20* (2006.01)
*H04N 5/225* (2006.01)
*G02B 9/60* (2006.01)
*G02B 15/167* (2006.01)
*G02B 5/00* (2006.01)
*G02B 3/04* (2006.01)
*G02B 13/18* (2006.01)

(56) References Cited

U.S. PATENT DOCUMENTS

| | | | |
|---|---|---|---|
| 5,760,957 A | 6/1998 | Suzuki | |
| 2007/0058266 A1 | 3/2007 | Kobayashi | |
| 2009/0208195 A1* | 8/2009 | Hatakeyama | 396/55 |
| 2010/0128361 A1* | 5/2010 | Shirota | 359/684 |
| 2010/0194928 A1 | 8/2010 | Amanai | |
| 2010/0196002 A1 | 8/2010 | Uchida et al. | |
| 2011/0109978 A1* | 5/2011 | Yamada et al. | 359/684 |
| 2013/0148005 A1* | 6/2013 | Imaoka et al. | 359/684 |

FOREIGN PATENT DOCUMENTS

| | | |
|---|---|---|
| JP | 63-285511 | 11/1988 |
| JP | 01-185608 | 7/1989 |
| JP | 02-136810 | 5/1990 |
| JP | 07-027978 | 1/1995 |
| JP | 2005-195757 | 7/2005 |
| JP | 2007-078799 | 3/2007 |
| JP | 2007-078800 | 3/2007 |
| JP | 2009-192771 | 8/2009 |
| JP | 2010-170084 | 8/2010 |
| JP | 2010-175955 | 8/2010 |
| JP | 2011-090099 | 5/2011 |

* cited by examiner

ZOOM LENS SYSTEM, INTERCHANGEABLE LENS APPARATUS AND CAMERA SYSTEM

CROSS-REFERENCE TO RELATED APPLICATION

This application is a Continuation of International Application No. PCT/JP2012/005101, filed on Aug. 10, 2012, which in turn claims the benefit of Japanese Application No. 2011-184165, filed on Aug. 25, 2011, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length.

As zoom lens systems to be used in interchangeable lens apparatuses, various kinds of zoom lens systems having high optical performance from a wide-angle limit to a telephoto limit have been proposed.

Japanese Laid-Open Patent Publication No. 2007-078799 discloses a variable-magnification optical system comprising a first lens unit composed of a single negative lens, a second lens unit composed of a single positive lens, and a third lens unit composed of a single negative meniscus lens with a concave surface facing an image side.

Japanese Laid-Open Patent Publication No. 2007-078800 discloses a variable-magnification optical system comprising a first lens unit having negative optical power, a second lens unit having positive optical power, and a third lens unit having negative optical power, in which at least one variable-refractive-index optical element is used in the first lens unit.

SUMMARY

The present disclosure provides a zoom lens system having, as well as excellent optical performance, a relatively high zoom ratio, and a short overall length that provides compactness and lightweight. Further, the present disclosure provides an interchangeable lens apparatus and a camera system, each employing the zoom lens system.

The novel concepts disclosed herein were achieved in order to solve the foregoing problems in the related art, and herein is disclosed:

a zoom lens system comprising a plurality of lens units, each lens unit having at least one lens element, wherein a lens unit located closest to an object side and a lens unit located closest to an image side are fixed with respect to an image surface in zooming from a wide-angle limit to a telephoto limit at a time of image taking, and at least three lens units among all the lens units are moving lens units that move along an optical axis in the zooming, at least one lens unit among the moving lens units is a focusing lens unit that moves along the optical axis in focusing from an infinity in-focus condition to a close-object in-focus condition, and the following condition (1) is satisfied:

$$\Sigma(Tn)/H \leq 2.1 \tag{1}$$

where $\Sigma(Tn)$ is the total of axial thicknesses of all the moving lens units, and H is the maximum image height.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, the zoom lens system comprising a plurality of lens units, each lens unit having at least one lens element, wherein a lens unit located closest to an object side and a lens unit located closest to an image side are fixed with respect to an image surface in zooming from a wide-angle limit to a telephoto limit at a time of image taking, and at least three lens units among all the lens units are moving lens units that move along an optical axis in the zooming, at least one lens unit among the moving lens units is a focusing lens unit that moves along the optical axis in focusing from an infinity in-focus condition to a close-object in-focus condition, and the following condition (1) is satisfied:

$$\Sigma(Tn)/H \leq 2.1 \tag{1}$$

where $\Sigma(Tn)$ is the total of axial thicknesses of all the moving lens units, and H is the maximum image height.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, the zoom lens system comprising a plurality of lens units, each lens unit having at least one lens element, wherein a lens unit located closest to an object side and a lens unit located closest to an image side are fixed with respect to an image surface in zooming from a wide-angle limit to a telephoto limit at a time of image taking, and at least three lens units among all the lens units are moving lens units that move along an optical axis in the zooming, at least one lens unit among the moving lens units is a focusing lens unit that moves along the optical axis in focusing from an infinity in-focus condition to a close-object in-focus condition, and the following condition (1) is satisfied:

$$\Sigma(Tn)/H \leq 2.1 \tag{1}$$

where

Σ(Tn) is the total of axial thicknesses of all the moving lens units, and

H is the maximum image height.

The zoom lens system according to the present disclosure has, as well as excellent optical performance, a relatively high zoom ratio, and a short overall length that provides compactness and lightweight. The zoom lens system is suitably applicable to a lens barrel in which movable lens units are independently driven by an actuator.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 4

FIGS. 1, 3, 5, and 7 are lens arrangement diagrams of zoom lens systems according to Embodiments 1 to 4, respectively, and each Fig. shows the zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). In each Fig., each bent arrow provided between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and therefore this line does not indicate actual motion of each lens unit.

Figure 3:
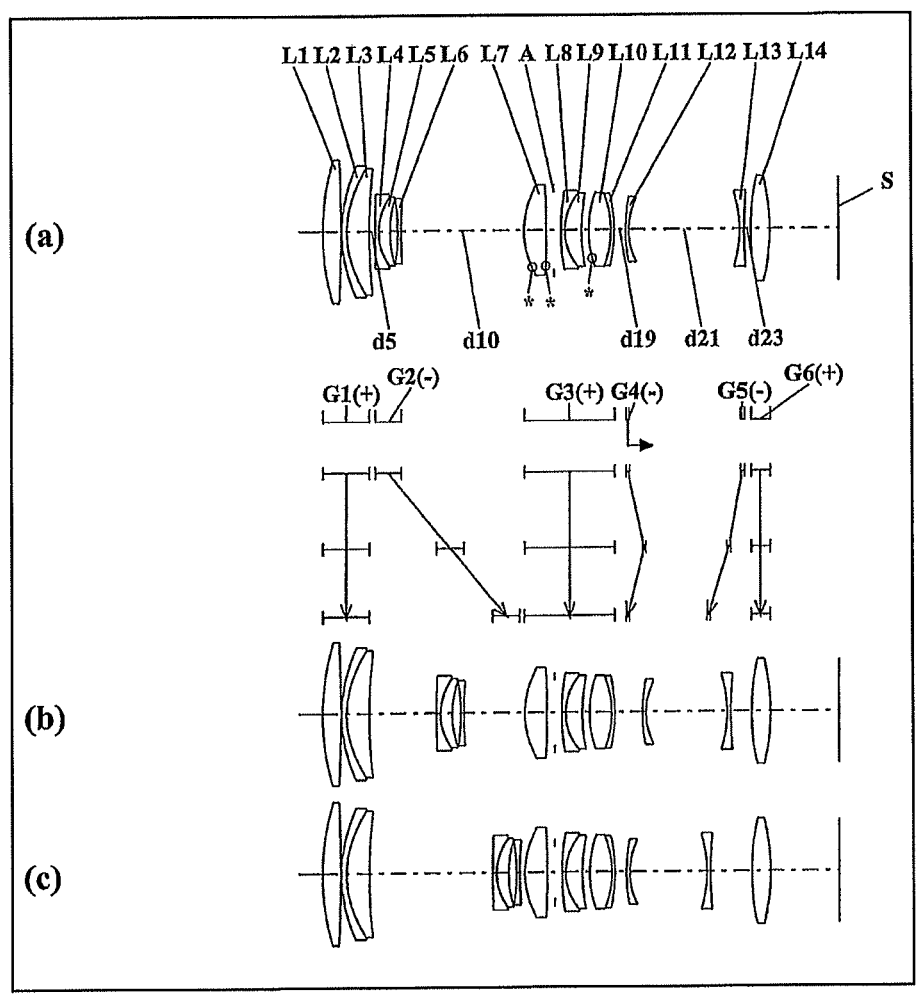
FIG. 3 is a lens arrangement diagram showing an infinity in-focus condition of a zoom lens system according to Embodiment 2 (Numerical Example 2)
Figure 4:
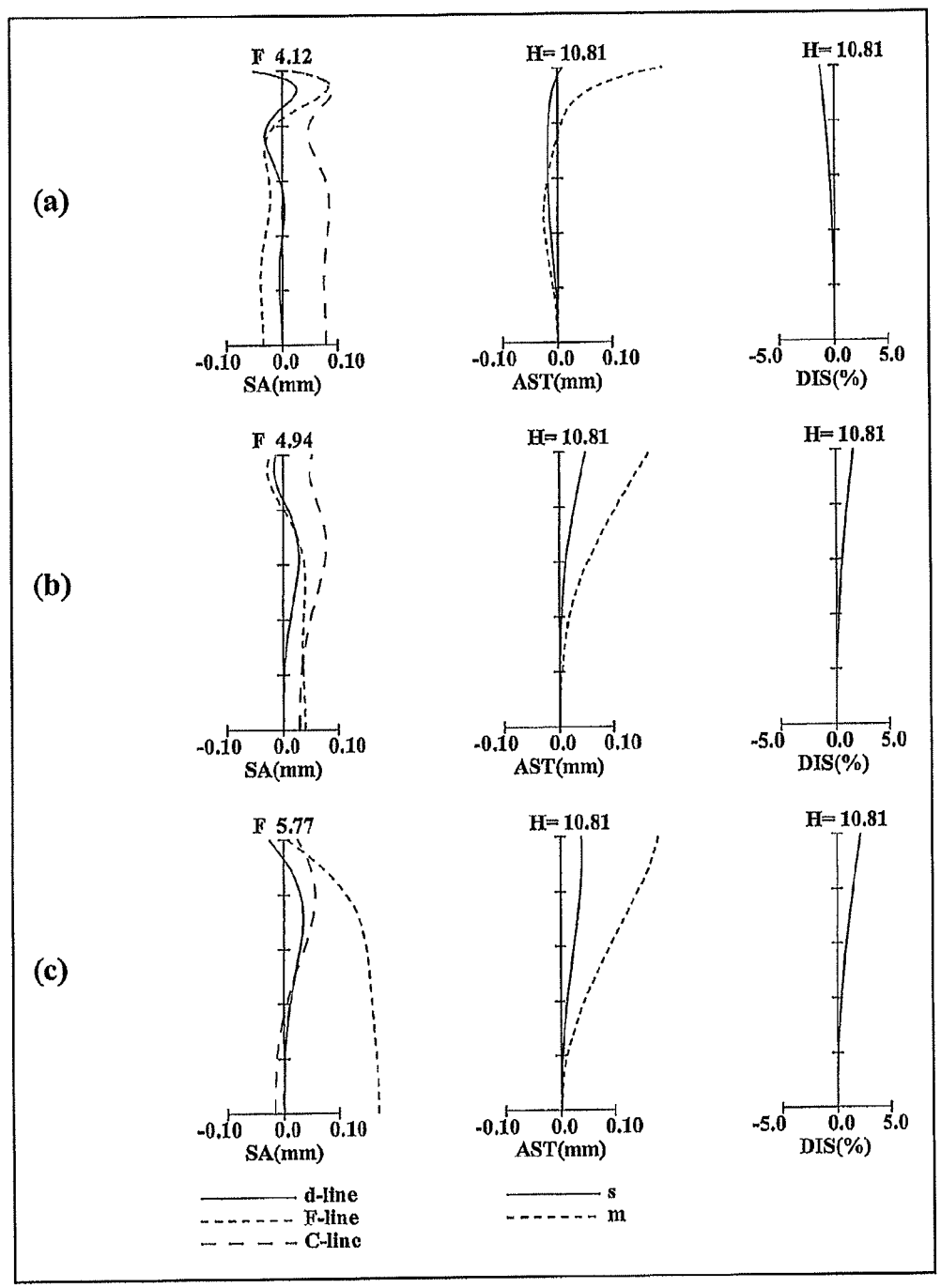
FIG. 4 is a longitudinal aberration diagram of the infinity in-focus condition of the zoom lens system according to Numerical Example 2.
Figure 5:
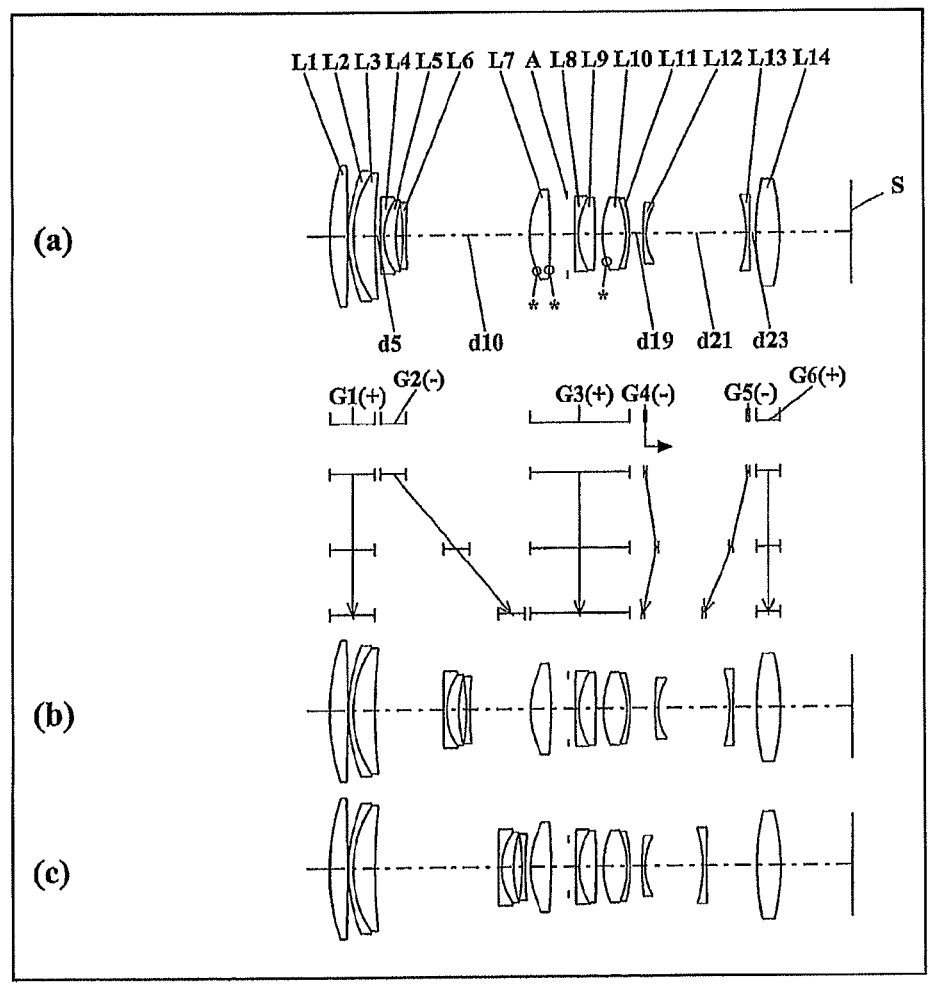
FIG. 5 is a lens arrangement diagram showing an infinity in-focus condition of a zoom lens system according to Embodiment 3 (Numerical Example 3)
Figure 6:
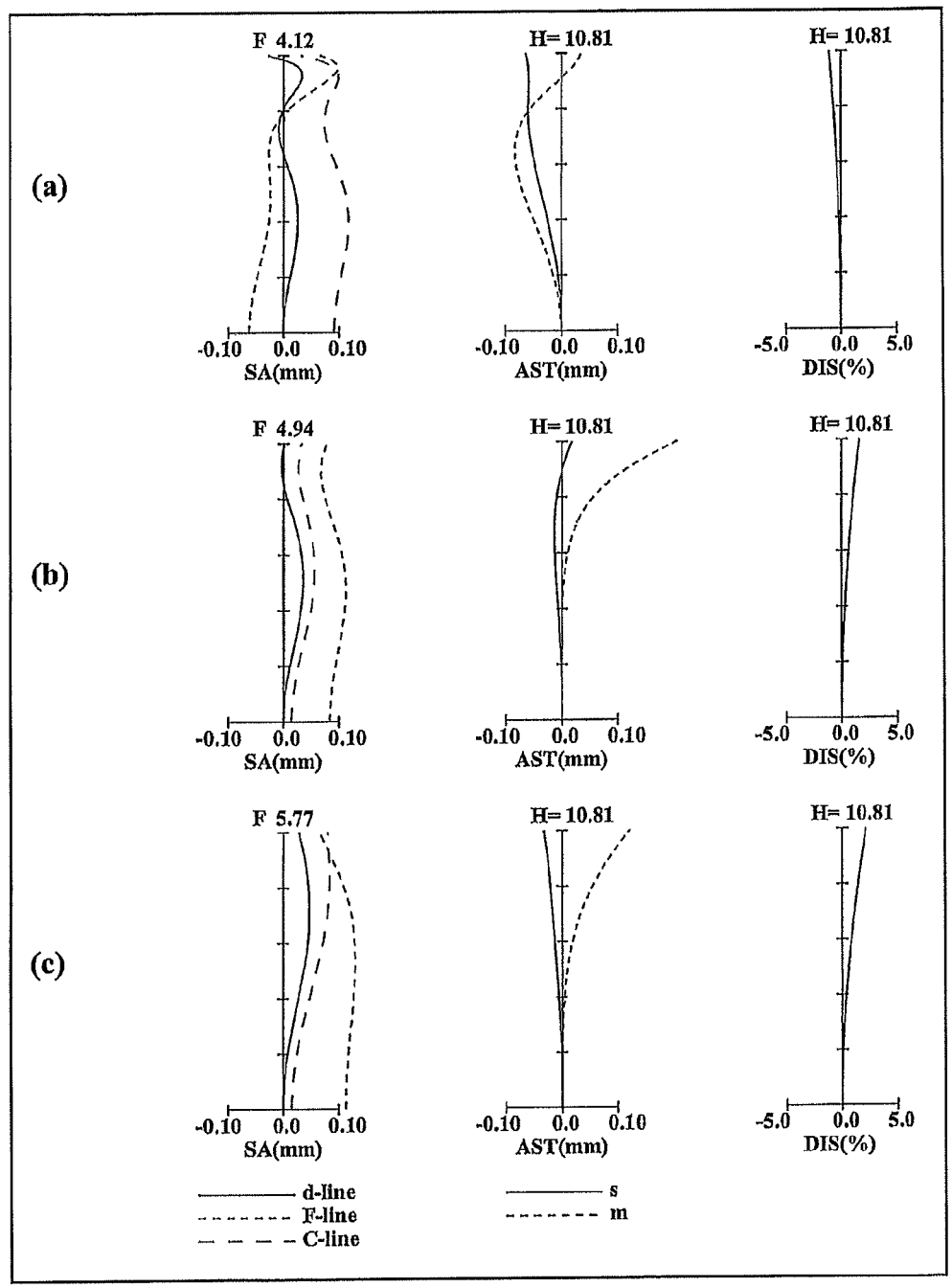
FIG. 6 is a longitudinal aberration diagram of the infinity in-focus condition of the zoom lens system according to Numerical Example 3.
Figure 7:
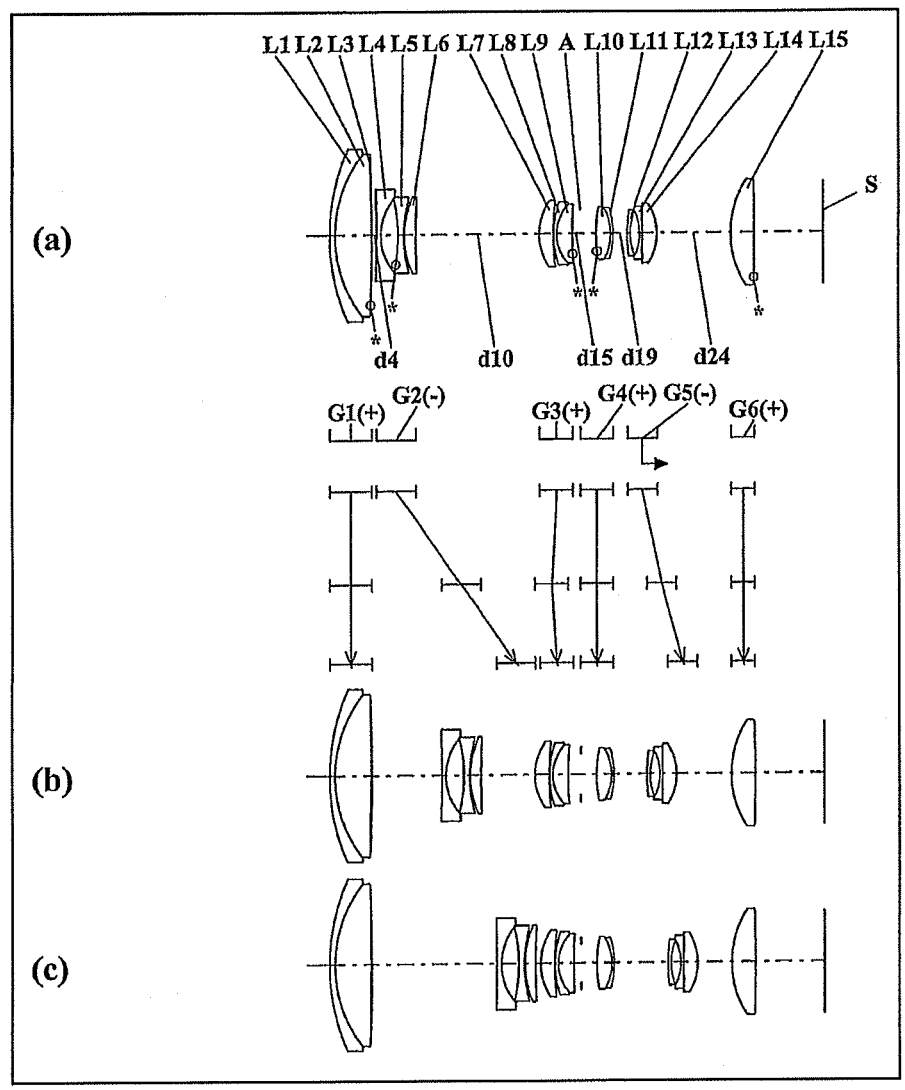
FIG. 7 is a lens arrangement diagram showing an infinity in-focus condition of a zoom lens system according to Embodiment 4 (Numerical Example 4)
Figure 8:
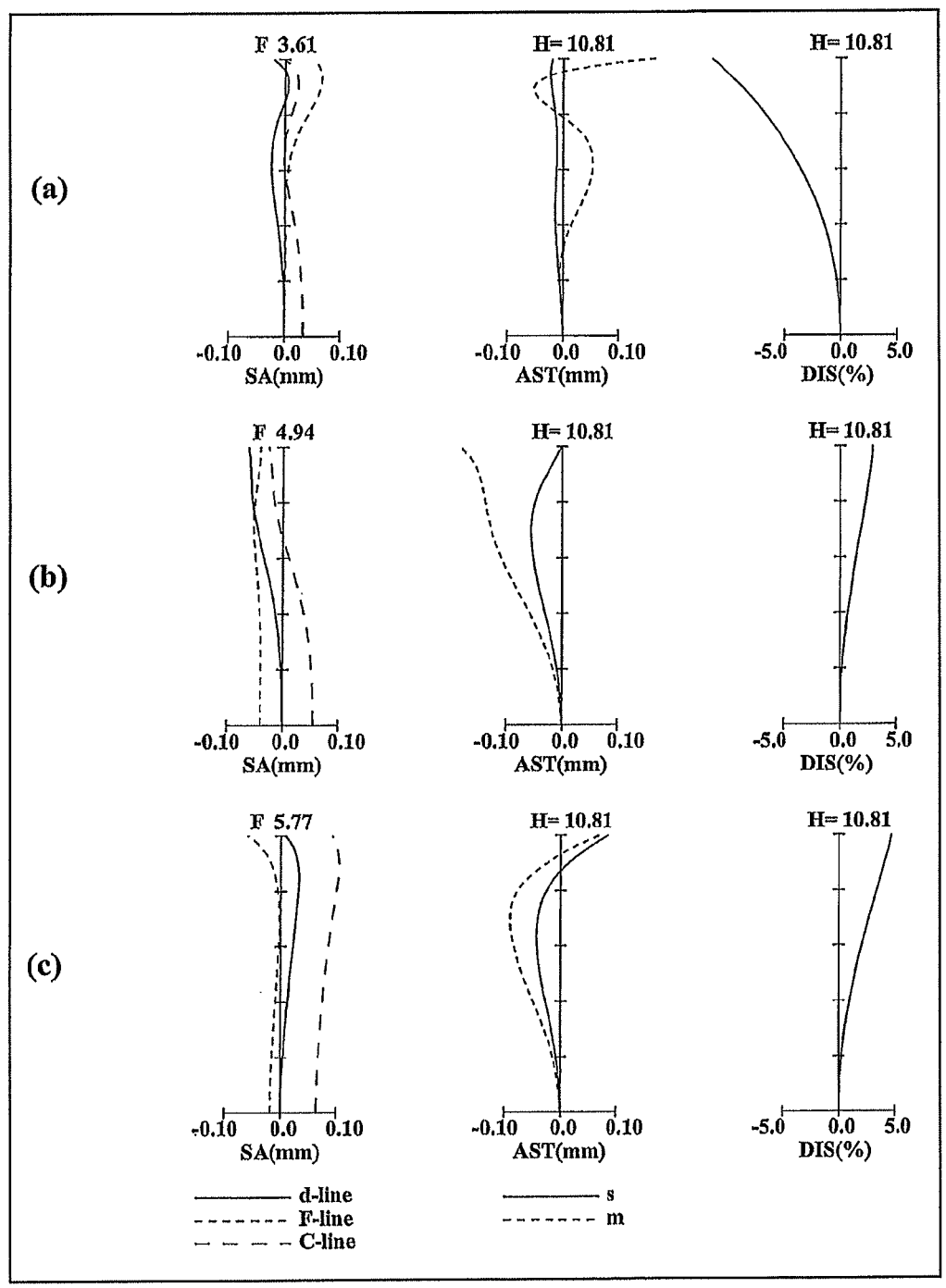
FIG. 8 is a longitudinal aberration diagram of the infinity in-focus condition of the zoom lens system according to Numerical Example 4.

Furthermore, in each Fig., an arrow imparted to each lens unit indicates focusing from an infinity in-focus condition to a close-object in-focus condition. That is, in FIG. 1, the arrow indicates a direction in which a fourth lens unit G4 and a fifth lens unit G5 described later move in focusing from an infinity in-focus condition to a close-object in-focus condition. In FIGS. 3 and 5, the arrow indicates a direction in which a fourth lens unit G4 described later moves in focusing from an infinity in-focus condition to a close-object in-focus condition. In FIG. 7, the arrow indicates a direction in which a fifth lens unit G5 described later moves in focusing from an infinity in-focus condition to a close-object in-focus condition.

Each of the zoom lens systems according to Embodiments 1 to 3, in order from the object side to the image side, comprises: a first lens unit G1 having positive optical power; a second lens unit G2 having negative optical power; a third lens unit G3 having positive optical power; a fourth lens unit G4 having negative optical power; a fifth lens unit G5 having negative optical power; and a sixth lens unit G6 having positive optical power. In the zoom lens system according to each of Embodiments 1 to 3, in zooming, the second lens unit G2, the fourth lens unit G4, and the fifth lens unit G5 individually move along the optical axis such that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each of Embodiments 1 to 3, these lens units are arranged in a desired optical power allocation, whereby size reduction of the entire lens system is achieved while maintaining high optical performance.

The zoom lens system according to Embodiment 4, in order from the object side to the image side, comprises: a first lens unit G1 having positive optical power; a second lens unit G2 having negative optical power; a third lens unit G3 having positive optical power; a fourth lens unit G4 having positive optical power; a fifth lens unit G5 having negative optical power; and a sixth lens unit G6 having positive optical power. In the zoom lens system according to Embodiment 4, in zooming, the second lens unit G2, the third lens unit G3, and the fifth lens unit G5 individually move along the optical axis such that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to Embodiment 4, these lens units are arranged in a desired optical power allocation, whereby size reduction of the entire lens system is achieved while maintaining high optical performance.

In FIGS. 1, 3, 5, and 7, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Figure 1:
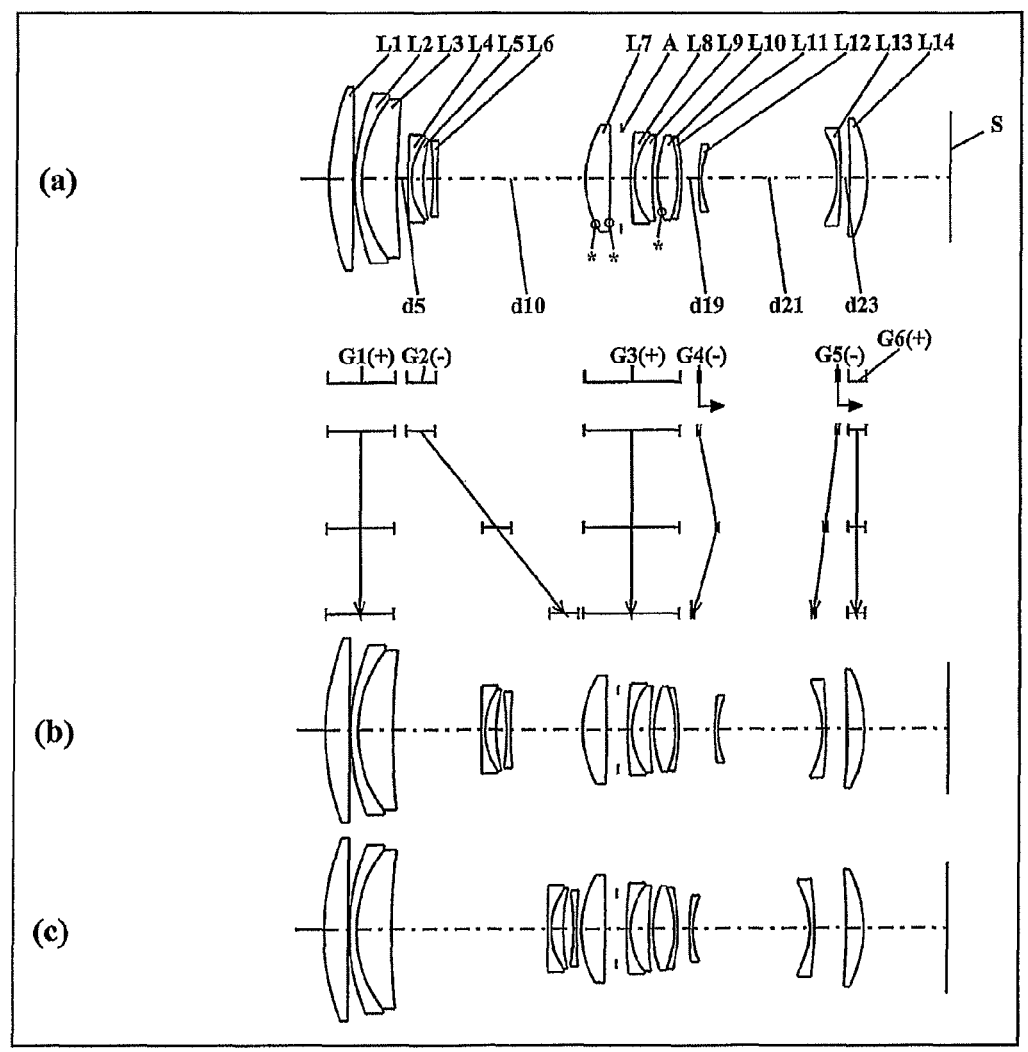
FIG. 1 is a lens arrangement diagram showing an infinity in-focus condition of a zoom lens system according to Embodiment 1 (Numerical Example 1)
Figure 2:
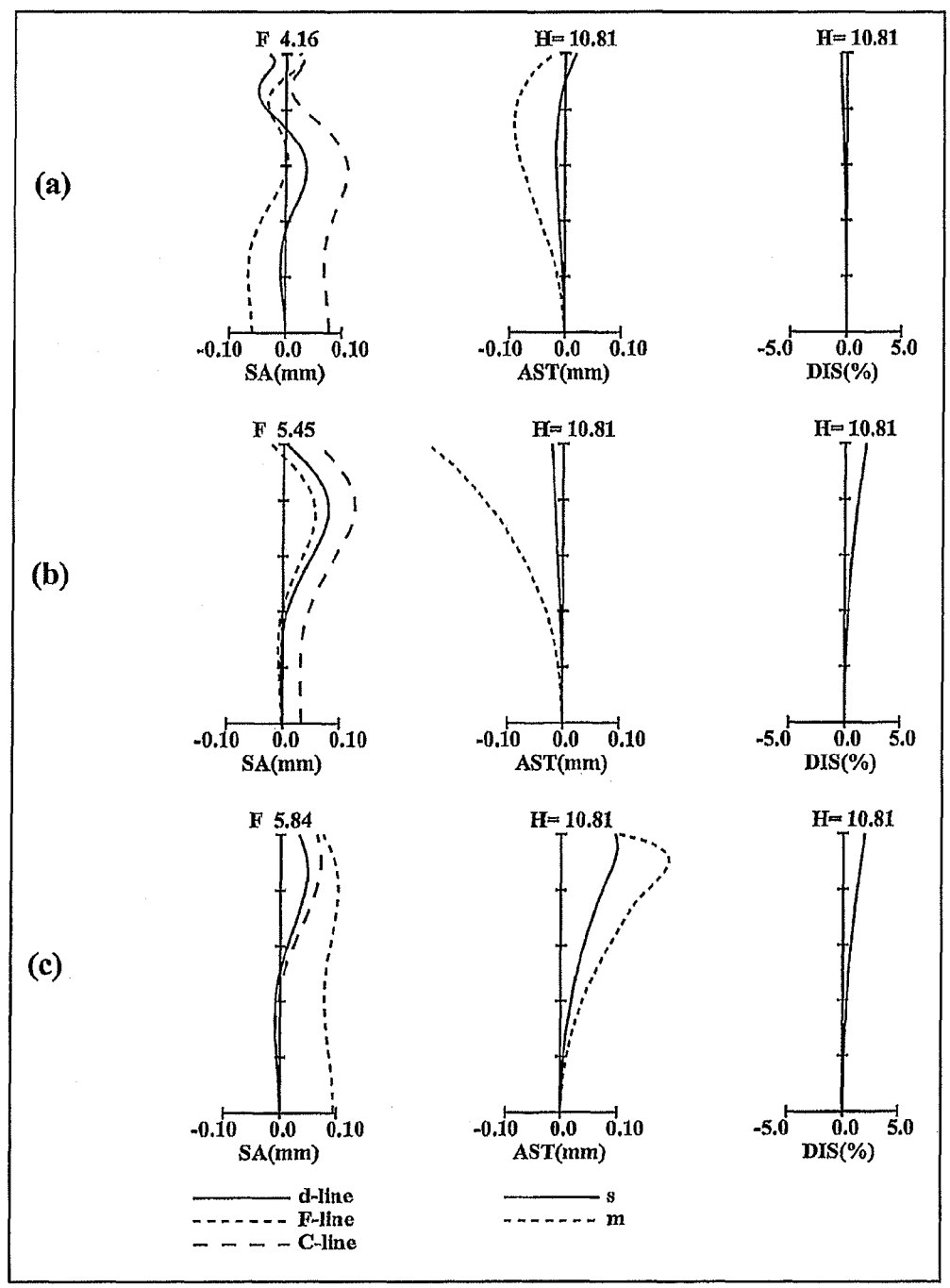
FIG. 2 is a longitudinal aberration diagram of the infinity in-focus condition of the zoom lens system according to Numerical Example 1.

As shown in FIGS. 1, 3, and 5, an aperture diaphragm A is provided between a seventh lens element L7 and an eighth lens element L8 in the third lens unit G3. As shown in FIG. 7, an aperture diaphragm A is provided on the side closest to the object in the fourth lens unit G4.

Embodiment 1

As shown in FIG. 1, the first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element L4 and the fifth lens element L5 are cemented with each other.

The third lens unit G3, in order from the object side to the image side, comprises: a bi-convex seventh lens element L7; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. An aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a negative meniscus thirteenth lens element L13 with the convex surface facing the image side.

The sixth lens unit G6 comprises solely a positive meniscus fourteenth lens element L14 with the convex surface facing the image side.

In the zoom lens system according to Embodiment 1, in zooming from a wide-angle limit to a telephoto limit at the time of image taking, the second lens unit G2 monotonically moves to the image side, the fourth lens unit G4 moves with locus of a convex to the image side, the fifth lens unit G5 monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5, which are moving lens units, individually move along the optical axis such that the interval between the first lens unit G1 and the second lens unit G2 increases, the interval between the second lens unit G2 and the third lens unit G3 decreases, the interval between the third lens unit G3 and the fourth lens unit G4 varies, the interval between the fourth lens unit G4 and the fifth lens unit G5 varies, and the interval between the fifth lens unit G5 and the sixth lens unit G6 increases.

Further, in the zoom lens system according to Embodiment 1, the fourth lens unit G4 and the fifth lens unit G5 among the moving lens units are focusing lens units that move along the optical axis in focusing from an infinity in-focus condition to a close-object in-focus condition. In focusing, both the fourth lens unit G4 and the fifth lens unit G5 move to the image side along the optical axis.

Embodiment 2

As shown in FIG. 3, the first lens unit G1, in order from the object side to the image side, comprises: a bi-convex first lens element L1; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element IA and the fifth lens element L5 are cemented with each other.

The third lens unit G3, in order from the object side to the image side, comprises: a bi-convex seventh lens element L7; a negative meniscus eighth lens element L8 with the convex surface facing the object side; a positive meniscus ninth lens element L9 with the convex surface facing the object side; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. An aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a bi-concave thirteenth lens element L13.

The sixth lens unit G6 comprises solely a bi-convex fourteenth lens element L14.

In the zoom lens system according to Embodiment 2, in zooming from a wide-angle limit to a telephoto limit at the time of image taking, the second lens unit G2 monotonically moves to the image side, the fourth lens unit G4 moves with locus of a convex to the image side, the fifth lens unit G5 approximately monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5, which are moving lens units, individually move along the optical axis such that the interval between the first lens unit G1 and the second lens unit G2 increases, the interval between the second lens unit G2 and the third lens unit G3 decreases, the interval between the third lens unit G3 and the fourth lens unit G4 varies, the interval between the fourth lens unit G4 and the fifth lens unit G5 varies, and the interval between the fifth lens unit G5 and the sixth lens unit G6 increases.

Further, in the zoom lens system according to Embodiment 2, the fourth lens unit G4 among the moving lens units is a focusing lens unit that moves along the optical axis in focusing from an infinity in-focus condition to a close-object in-focus condition. In focusing, the fourth lens unit G4 moves to the image side along the optical axis.

Embodiment 3

As shown in FIG. 5, the first lens unit G1, in order from the object side to the image side, comprises: a bi-convex first lens element L1; a negative meniscus second lens element L2 with the convex surface facing the object side; and a positive meniscus third lens element L3 with the convex surface facing the object side. Among these, the second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. Among these, the fourth lens element L4 and the fifth lens element L5 are cemented with each other.

The third lens unit G3, in order from the object side to the image side, comprises: a bi-convex seventh lens element L7; a negative meniscus eighth lens element L8 with the convex surface facing the object side; a bi-convex ninth lens element L9; a bi-convex tenth lens element L10; and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. An aperture diaphragm A is provided between the seventh lens element L7 and the eighth lens element L8.

The fourth lens unit G4 comprises solely a negative meniscus twelfth lens element L12 with the convex surface facing the object side.

The fifth lens unit G5 comprises solely a bi-concave thirteenth lens element L13.

The sixth lens unit G6 comprises solely a bi-convex fourteenth lens element L14.

In the zoom lens system according to Embodiment 3, in zooming from a wide-angle limit to a telephoto limit at the time of image taking, the second lens unit G2 monotonically moves to the image side, the fourth lens unit G4 moves with locus of a convex to the image side, the fifth lens unit G5 approximately monotonically moves to the object side, and the first lens unit G1, the third lens unit G3, and the sixth lens unit G6 are fixed with respect to the image surface S. That is, in zooming, the second lens unit G2, the fourth lens unit G4, and the fifth lens unit G5, which are moving lens units, individually move along the optical axis such that the interval between the first lens unit G1 and the second lens unit G2 increases, the interval between the second lens unit G2 and the third lens unit G3 decreases, the interval between the third lens unit G3 and the fourth lens unit G4 varies, the interval between the fourth lens unit G4 and the fifth lens unit G5 varies, and the interval between the fifth lens unit G5 and the sixth lens unit G6 increases.

Further, in the zoom lens system according to Embodiment 3, the fourth lens unit G4 among the moving lens units is a focusing lens unit that moves along the optical axis in focusing from an infinity in-focus condition to a close-object in-focus condition. In focusing, the fourth lens unit G4 moves to the image side along the optical axis.

Embodiment 4

As shown in FIG. 7, the first lens unit G1, in order from the object side to the image side, comprises: a negative meniscus first lens element L1 with the convex surface facing the object side; a bi-convex second lens element L2; and a positive meniscus third lens element L3 with the convex surface facing the image side. The first lens element L1, the second lens element L2, and the third lens element L3 are cemented with each other. The third lens element L3 is an aspherical lens element formed of a thin layer of resin or the like, and has an aspheric image side surface.

The second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 has an aspheric object side surface.

The third lens unit G3, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. Among these, the eighth lens element L8 and the ninth lens element L9 are cemented with each other. The ninth lens element L9 has an aspheric image side surface.

The fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other. The tenth lens element L10 has an aspheric object side surface. Further, an aperture diaphragm A is provided on the object side relative to the tenth lens element L10.

The fifth lens unit G5, in order from the object side to the image side, comprises: a negative meniscus twelfth lens element L12 with the convex surface facing the object side; a bi-concave thirteenth lens element L13; and a bi-convex fourteenth lens element L14. Among these, the thirteenth lens element L13 and the fourteenth lens element L14 are cemented with each other.

The sixth lens unit G6 comprises solely a bi-convex fifteenth lens element L15. The fifteenth lens element L15 has an aspheric image side surface.

In the zoom lens system according to Embodiment 4, in zooming from a wide-angle limit to a telephoto limit at the time of image taking, the second lens unit G2 and the fifth lens unit G5 monotonically move to the image side, the third lens unit G3 moves with locus of a slight convex to the object side, and the first lens unit G1, the fourth lens unit G4, and the sixth lens unit G6 are fixed with respect to the image surface S. That is, in zooming, the second lens unit G2, the third lens unit G3, and the fifth lens unit G5, which are moving lens units, individually move along the optical axis such that the interval between the first lens unit G1 and the second lens unit G2 increases, the interval between the second lens unit G2 and the third lens unit G3 decreases, the interval between the third lens unit G3 and the fourth lens unit G4 varies, the interval between the fourth lens unit G4 and the fifth lens unit G5 increases, and the interval between the fifth lens unit G5 and the sixth lens unit G6 decreases.

Further, in the zoom lens system according to Embodiment 4, the fifth lens unit G5 among the moving lens units is a focusing lens unit that moves along the optical axis in focusing from an infinity in-focus condition to a close-object in-focus condition. In focusing, the fifth lens unit G5 moves to the image side along the optical axis.

In the zoom lens systems according to Embodiments 1 to 3, the first lens unit G1 located closest to the object side, and the third lens unit G3 and the sixth lens unit G6 located closest to the image side, each of which is at least one lens unit other than the first lens unit G1, are fixed with respect to the image surface S in zooming from a wide-angle limit to a telephoto limit at the time of image taking, and at least three lens units among all the lens units, i.e., the second lens unit G2, the fourth lens unit G4, and the fifth lens unit G5, are moving lens units that move along the optical axis in the zooming.

In the zoom lens system according to Embodiment 4, the first lens unit G1 located closest to the object side, and the fourth lens unit G4 and the sixth lens unit G6 located closest to the image side, each of which is at least one lens unit other than the first lens unit G1, are fixed with respect to the image surface S in zooming from a wide-angle limit to a telephoto limit at the time of image taking, and at least three lens units among all the lens units, i.e., the second lens unit G2, the third lens unit G3, and the fifth lens unit G5, are moving lens units that move along the optical axis in the zooming.

As described above, Embodiments 1 to 4 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 4 can satisfy. Here, a plurality of conditions is set forth for the zoom lens system according to each embodiment. A construction that satisfies all the plural conditions is most effective for the zoom lens system. However, when an individual condition is satisfied, a zoom lens system having the corresponding effect is obtained.

For example, in a zoom lens system like the zoom lens systems according to Embodiments 1 to 4, which comprises a plurality of lens units each having at least one lens element, and in which a lens unit located closest to the object side and a lens unit located closest to the image side are fixed with respect to the image surface in zooming from a wide-angle limit to a telephoto limit at the time of image taking, and at least three lens units among all the lens units are moving lens units that move along the optical axis in the zooming, and in which at least one lens unit among the moving lens units is a focusing lens unit that moves along the optical axis in focusing from an infinity in-focus condition to a close-object in-focus condition (this lens configuration is referred to as a basic configuration of the embodiment, hereinafter), the following condition (1) is satisfied:

$$\Sigma(Tn)/H \leq 2.1 \tag{1}$$

where $\Sigma(Tn)$ is the total of axial thicknesses of all the moving lens units, and H is the maximum image height.

The condition (1) sets forth the axial thicknesses of all the moving lens units. When the condition (1) is not satisfied, weight reduction of the moving lens units is difficult. Therefore, high-speed and silent driving cannot be achieved, and further, low-power driving cannot be achieved.

When at least one of the following conditions (1-1)' and (1-1)" is satisfied, the above-mentioned effect is achieved more successfully. When the condition (1-1)' is satisfied, compensation of aberration can be facilitated.

$$0.5 \leq \Sigma(Tn)/H \tag{1-1}'$$

$$\Sigma(Tn)/H \leq 1.5 \tag{1-1}''$$

When the following condition (1-2)' is further satisfied, the above-mentioned effect is achieved more successfully.

$$\Sigma(Tn)/H \leq 0.8 \tag{1-2}'$$

It is beneficial that a zoom lens system having the basic configuration like the zoom lens systems according to Embodiments 1 to 4 satisfies the following condition (2):

$$\Sigma(Tn_2)/H \leq 0.5 \tag{2}$$

where $\Sigma(Tn_2)$ is the total of axial thicknesses of all the moving lens units other than a moving lens unit having the largest axial thickness, and H is the maximum image height.

The condition (2) sets forth the total of axial thicknesses of all the moving lens units other than the moving lens unit having the largest axial thickness. Satisfying the condition (2) means that a lens unit which is particularly lightweight and suitable for focusing required to have a far higher operation speed as compared to zooming, is included in the moving lens units. When the condition (2) is not satisfied, it is difficult to achieve high-speed and silent focusing.

When at least one of the following conditions (2-1)' and (2-1)" is satisfied, the above-mentioned effect is achieved more successfully. When the condition (2-1)' is satisfied, compensation of aberration can be facilitated.

$$0.08 \leq \Sigma(Tn_2)/H \tag{2-1}'$$

$$\Sigma(Tn_2)/H \leq 0.30 \tag{2-1}''$$

When the following condition (2-2)' is further satisfied, the above-mentioned effect is achieved more successfully.

$$\Sigma(Tn_2)/H \leq 0.2 \tag{2-2}'$$

It is beneficial that a zoom lens system having the basic configuration like the zoom lens systems according to Embodiments 1 to 4 satisfies the following condition (3):

$$0.1 \leq T_1/f_W \leq 1.5 \tag{3}$$

where $T_1$ is an axial length from a most object side lens surface of the lens unit located closest to the object side to a most image side lens surface of the lens unit located closest to the object side, and $f_W$ is a focal length on a d-line (wavelength: 587.56 nm) of the zoom lens system at a wide-angle limit.

The condition (3) sets forth the thickness of the lens unit located closest to the object side, i.e., the first lens unit. When the value goes below the lower limit of the condition (3), the number of lens elements constituting the first lens unit cannot be increased, which makes it difficult to compensate axial chromatic aberration and magnification chromatic aberration. When the value exceeds the upper limit of the condition (3), the axial thickness of the first lens unit increases, and a compact and lightweight zoom lens system cannot be realized.

When at least one of the following conditions (3-1)' and (3-1)" is satisfied, the above-mentioned effect is achieved more successfully.

$$0.15 \leq T_1/f_W \quad (3\text{-}1)'$$

$$T_1/f_W \leq 1.00 \quad (3\text{-}1)''$$

When at least one of the following conditions (3-2)' and (3-2)" is further satisfied, the above-mentioned effect is achieved more successfully.

$$0.2 \leq T_1/f_W \quad (3\text{-}2)'$$

$$T_1/f_W \leq 0.3 \quad (3\text{-}2)''$$

The individual lens units constituting the zoom lens systems according to Embodiments 1 to 4 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 5

Figure 9:
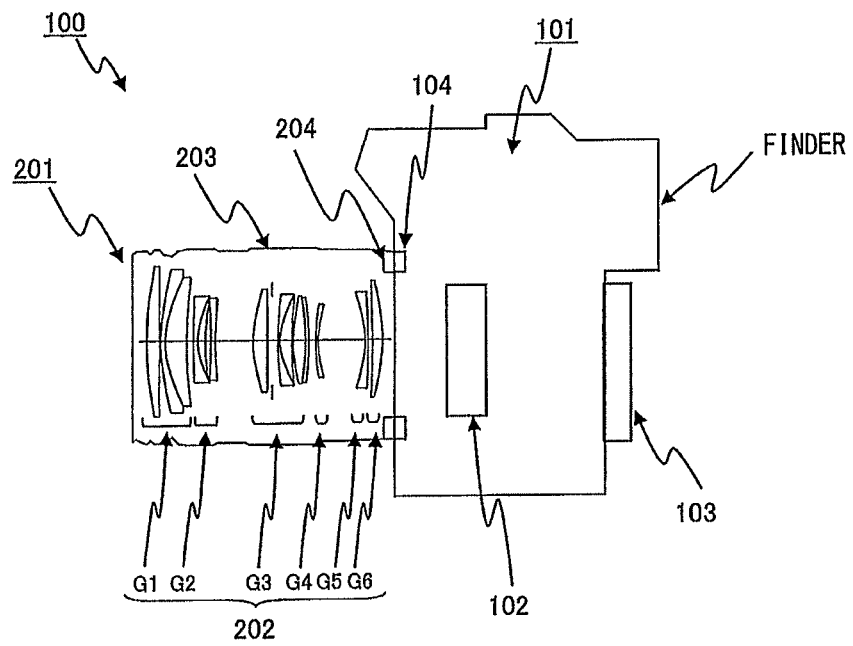
FIG. 9 is a schematic construction diagram of an interchangeable-lens type digital camera system according to Embodiment 5.

FIG. 9 is a schematic construction diagram of an interchangeable-lens type digital camera system according to Embodiment 5.

The interchangeable-lens type digital camera system 100 according to Embodiment 5 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 4; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 9, the zoom lens system according to Embodiment 1 is employed as the zoom lens system 202.

In Embodiment 5, since the zoom lens system 202 according to any of Embodiments 1 to 4 is employed, a compact interchangeable lens apparatus having excellent imaging performance can be realized at low cost. Moreover, size reduction and cost reduction of the entire camera system 100 according to Embodiment 5 can be achieved. In the zoom lens systems according to Embodiments 1 to 4, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 4.

As described above, Embodiment 5 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 4 are implemented. Here, in the numerical examples, the units of length are all "mm", while the units of view angle are all "°". Moreover, in the numerical examples, r is the radius of curvature, d is the axial distance, nd is the refractive index to the d-line, and νd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 4, 6, and 8 are longitudinal aberration diagrams of an infinity in-focus condition of the zoom lens systems according to Numerical Examples 1 to 4, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows the zoom lens unit data.

TABLE 1

(Surface data)

| Surface number | r | d | nd | vd |
|---|---|---|---|---|
| Object surface | ∞ | | | |
| 1 | 44.27700 | 4.20000 | 1.48749 | 70.4 |
| 2 | ∞ | 0.20000 | | |
| 3 | 38.42600 | 1.20000 | 1.80100 | 35.0 |
| 4 | 23.09300 | 6.00000 | 1.49700 | 81.6 |
| 5 | 139.11200 | Variable | | |
| 6 | 400.00000 | 0.60000 | 1.80450 | 39.6 |
| 7 | 12.14200 | 2.00000 | 1.92286 | 20.9 |
| 8 | 25.50000 | 1.81000 | | |
| 9 | −43.77500 | 0.60000 | 1.80420 | 46.5 |
| 10 | 67.77300 | Variable | | |
| 11* | 17.73500 | 4.20000 | 1.80755 | 40.9 |
| 12* | −396.27400 | 2.00000 | | |
| 13(Diaphragm) | ∞ | 1.70000 | | |
| 14 | 75.47700 | 0.60000 | 1.90366 | 31.3 |
| 15 | 11.83500 | 3.20000 | 1.49700 | 81.6 |
| 16 | 55.71600 | 0.76000 | | |
| 17* | 21.35300 | 3.60000 | 1.58250 | 59.4 |
| 18 | −21.35300 | 0.60000 | 1.75520 | 27.5 |
| 19 | −34.72700 | Variable | | |
| 20 | 44.24600 | 0.50000 | 1.72916 | 54.7 |
| 21 | 15.08300 | Variable | | |
| 22 | −16.27400 | 0.70000 | 1.72916 | 54.7 |
| 23 | −74.53400 | Variable | | |
| 24 | −147.97100 | 3.00000 | 1.84666 | 23.8 |
| 25 | −23.42500 | (BF) | | |
| Image surface | ∞ | | | |

TABLE 2

(Aspherical data)

Surface No. 11

$K = 0.00000E+00, A4 = -8.98800E-06, A6 = -4.12000E-08,$
$A8 = 1.29600E-10\ A10 = -1.17900E-11$

Surface No. 12

$K = 0.00000E+00, A4 = 1.41500E-05, A6 = -1.88800E-08,$
$A8 = -1.01700E-09\ A10 = -3.78100E-12$

Surface No. 17

$K = 0.00000E+00, A4 = -1.87500E-05, A6 = -7.53000E-08,$
$A8 = 2.31200E-10\ A10 = 1.93800E-13$

TABLE 3

(Various data in an infinity in-focus condition)
Zooming ratio 3.70254

| | Wide-angle limit | Middle position | Telephoto limit |
|---|---|---|---|
| Focal length | 45.1684 | 87.7062 | 167.2377 |
| F-number | 4.15704 | 5.44688 | 5.83639 |
| Half view angle | 13.5369 | 6.8993 | 3.6302 |
| Image height | 10.8150 | 10.8150 | 10.8150 |
| Overall length of lens system | 107.5269 | 107.5266 | 107.5268 |
| BF | 14.60331 | 14.60288 | 14.60312 |
| d5 | 1.9704 | 15.2517 | 26.9947 |
| d10 | 25.7814 | 12.5001 | 0.7571 |
| d19 | 2.9764 | 6.2268 | 2.1414 |
| d21 | 23.0885 | 17.7935 | 19.9087 |
| d23 | 1.6369 | 3.6816 | 5.6518 |

TABLE 4

(Zoom lens unit data)

| Lens unit | Initial surface No. | Focal length |
|---|---|---|
| 1 | 1 | 64.11496 |
| 2 | 6 | −18.08308 |
| 3 | 11 | 20.11986 |
| 4 | 20 | −31.61243 |
| 5 | 22 | −28.69864 |
| 6 | 24 | 32.51215 |

Numerical Example 2

The zoom lens system of Numerical Example 2 corresponds to Embodiment 2 shown in FIG. 3. Table 5 shows the surface data of the zoom lens system of Numerical Example 2. Table 6 shows the aspherical data. Table 7 shows various data in an infinity in-focus condition. Table 8 shows the zoom lens unit data.

TABLE 5

(Surface data)

| Surface number | r | d | nd | vd |
|---|---|---|---|---|
| Object surface | ∞ | | | |
| 1 | 54.35860 | 4.14390 | 1.48749 | 70.4 |
| 2 | −293.24900 | 0.15000 | | |
| 3 | 36.90230 | 1.00000 | 1.85026 | 32.3 |
| 4 | 24.73000 | 5.00000 | 1.49700 | 81.6 |
| 5 | 116.94580 | Variable | | |
| 6 | 299.48500 | 0.80000 | 1.80610 | 33.3 |
| 7 | 13.15670 | 2.52440 | 1.94595 | 18.0 |
| 8 | 24.75430 | 1.78040 | | |
| 9 | −40.03730 | 0.70000 | 1.80420 | 46.5 |
| 10 | 95.36520 | Variable | | |
| 11* | 18.21400 | 4.94770 | 1.73077 | 40.5 |
| 12* | −254.81190 | 1.74960 | | |
| 13(Diaphragm) | ∞ | 1.50000 | | |
| 14 | 52.13150 | 0.80000 | 1.90366 | 31.3 |
| 15 | 12.51040 | 3.69220 | 1.48749 | 70.4 |
| 16 | 41.64890 | 1.60000 | | |
| 17* | 22.31200 | 4.85300 | 1.58913 | 61.3 |
| 18 | −21.79360 | 0.70000 | 1.76182 | 26.6 |
| 19 | −34.45100 | Variable | | |
| 20 | 41.83500 | 0.70000 | 1.77250 | 49.6 |
| 21 | 15.81180 | Variable | | |
| 22 | −27.31410 | 0.80000 | 1.80420 | 46.5 |
| 23 | 95.60580 | Variable | | |
| 24 | 51.13830 | 4.04380 | 1.84666 | 23.8 |
| 25 | −54.86380 | (BF) | | |
| Image surface | ∞ | | | |

TABLE 6

(Aspherical data)

Surface No. 11

$K = 0.00000E+00, A4 = -1.53017E-05, A6 = -2.77884E-08,$
$A8 = -4.66255E-10\ A10 = -1.11845E-11$

Surface No. 12

$K = 0.00000E+00, A4 = 4.36828E-06, A6 = 5.32333E-08,$
$A8 = -2.54160E-09\ A10 = 1.79282E-12$

Surface No. 17

$K = 0.00000E+00, A4 = -2.15990E-05, A6 = 1.15735E-07,$
$A8 = -4.20116E-09\ A10 = 3.76100E-11$

TABLE 7

(Various data in an infinity in-focus condition)
Zooming ratio 3.66237

|  | Wide-angle limit | Middle position | Telephoto limit |
|---|---|---|---|
| Focal length | 46.3498 | 88.7103 | 169.7501 |
| F-number | 4.12039 | 4.94458 | 5.76850 |
| Half view angle | 13.2930 | 6.8442 | 3.5698 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.3140 | 14.9096 | 27.0551 |
| d10 | 26.7846 | 13.1890 | 1.0435 |
| d19 | 2.6023 | 6.1759 | 2.6000 |
| d21 | 24.2630 | 17.7843 | 16.9458 |
| d23 | 1.5000 | 4.4051 | 8.8195 |

TABLE 8

(Zoom lens unit data)

| Lens unit | Initial surface No. | Focal length |
|---|---|---|
| 1 | 1 | 64.18055 |
| 2 | 6 | −18.66788 |
| 3 | 11 | 21.47506 |
| 4 | 20 | −33.29532 |
| 5 | 22 | −26.34068 |
| 6 | 24 | 31.81779 |

Numerical Example 3

The zoom lens system of Numerical Example 3 corresponds to Embodiment 3 shown in FIG. 5. Table 9 shows the surface data of the zoom lens system of Numerical Example 3. Table 10 shows the aspherical data. Table 11 shows various data in an infinity in-focus condition. Table 12 shows the zoom lens unit data.

TABLE 9

(Surface data)

| Surface number | r | d | nd | vd |
|---|---|---|---|---|
| Object surface | ∞ | | | |
| 1 | 53.12790 | 4.00010 | 1.48749 | 70.4 |
| 2 | −523.90820 | 0.15000 | | |
| 3 | 37.86710 | 1.00000 | 1.85026 | 32.3 |
| 4 | 25.69490 | 4.96280 | 1.49700 | 81.6 |
| 5 | 135.25000 | Variable | | |
| 6 | 542.82840 | 0.80000 | 1.80610 | 33.3 |
| 7 | 13.95760 | 2.67500 | 1.94595 | 18.0 |
| 8 | 25.73710 | 1.76960 | | |
| 9 | −48.06010 | 0.70000 | 1.80420 | 46.5 |
| 10 | 78.43530 | Variable | | |
| 11* | 20.90510 | 4.68260 | 1.73077 | 40.5 |
| 12* | −103.52470 | 3.88060 | | |
| 13(Diaphragm) | ∞ | 1.50000 | | |
| 14 | 876.57380 | 0.80000 | 1.90366 | 31.3 |
| 15 | 15.92120 | 3.82990 | 1.48749 | 70.4 |
| 16 | −204.48100 | 1.60000 | | |
| 17* | 21.02820 | 5.00000 | 1.58913 | 61.3 |
| 18 | −20.67470 | 0.70000 | 1.76182 | 26.6 |
| 19 | −33.14000 | Variable | | |
| 20 | 71.13160 | 0.70000 | 1.77250 | 49.6 |
| 21 | 13.94640 | Variable | | |
| 22 | −29.38550 | 0.80000 | 1.80420 | 46.5 |
| 23 | 270.34800 | Variable | | |
| 24 | 58.17970 | 5.00000 | 1.84666 | 23.8 |
| 25 | −50.77630 | (BF) | | |
| Image surface | ∞ | | | |

TABLE 10

(Aspherical data)

Surface No. 11

K = 0.00000E+00, A4 = −7.53929E−06, A6 = 2.34563E−09, A8 = −1.57108E−10 A10 = −2.18254E−12

Surface No. 12

K = 0.00000E+00, A4 = 1.03152E−05, A6 = 1.26993E−08, A8 = −3.99096E−10 A10 = −9.17315E−13

Surface No. 17

K = 0.00000E+00, A4 = −2.15516E−05, A6 = −4.36232E−11, A8 = −1.25723E−09 A10 = 9.25701E−12

TABLE 11

(Various data in an infinity in-focus condition)
Zooming ratio 3.66231

|  | Wide-angle limit | Middle position | Telephoto limit |
|---|---|---|---|
| Focal length | 46.3507 | 88.6931 | 169.7505 |
| F-number | 4.12019 | 4.94424 | 5.76830 |
| Half view angle | 13.2727 | 6.8467 | 3.5708 |
| Image height | 10.8150 | 10.8150 | 10.8150 |
| Overall length of lens system | 116.0000 | 116.0000 | 116.0000 |
| BF | 16.1500 | 16.1500 | 16.1500 |
| d5 | 1.2086 | 15.3858 | 27.7816 |
| d10 | 27.8340 | 13.6569 | 1.2611 |
| d19 | 3.1788 | 5.5141 | 2.6000 |
| d21 | 21.5762 | 15.5785 | 12.5326 |
| d23 | 1.5000 | 5.1624 | 11.1224 |

TABLE 12

(Zoom lens unit data)

| Lens unit | Initial surface No. | Focal length |
|---|---|---|
| 1 | 1 | 64.46541 |
| 2 | 6 | −19.03422 |
| 3 | 11 | 20.96031 |
| 4 | 20 | −22.57697 |
| 5 | 22 | −32.91855 |
| 6 | 24 | 32.71188 |

Numerical Example 4

The zoom lens system of Numerical Example 4 corresponds to Embodiment 4 shown in FIG. 7. Table 13 shows the surface data of the zoom lens system of Numerical Example 4. Table 14 shows the aspherical data. Table 15 shows various data in an infinity in-focus condition. Table 16 shows the zoom lens unit data.

TABLE 13

(Surface data)

| Surface number | r | d | nd | vd |
|---|---|---|---|---|
| Object surface | ∞ | | | |
| 1 | 46.59700 | 1.20000 | 1.84666 | 23.8 |
| 2 | 29.34880 | 8.06990 | 1.72916 | 54.7 |
| 3 | −503.48930 | 0.14340 | 1.51340 | 52.9 |
| 4* | −317.73390 | Variable | | |
| 5 | −285.09150 | 0.95000 | 1.91082 | 35.2 |
| 6 | 12.84580 | 3.82700 | | |
| 7* | −34.42170 | 1.20000 | 1.69400 | 56.3 |
| 8 | 31.35840 | 0.15000 | | |
| 9 | 22.15390 | 2.37610 | 1.94595 | 18.0 |
| 10 | 195.32360 | Variable | | |
| 11 | 13.52110 | 3.01390 | 1.68893 | 31.2 |
| 12 | 66.99660 | 0.15000 | | |
| 13 | 23.77100 | 0.60000 | 1.90366 | 31.3 |
| 14 | 9.49470 | 3.46580 | 1.50670 | 70.5 |
| 15* | 302.21690 | Variable | | |
| 16(Diaphragm) | ∞ | 3.50000 | | |
| 17* | 31.79690 | 3.21400 | 1.58700 | 59.6 |
| 18 | −10.67340 | 0.50000 | 1.84666 | 23.8 |
| 19 | −19.18930 | Variable | | |
| 20 | 61.91570 | 0.60000 | 1.91082 | 35.2 |
| 21 | 13.28250 | 2.18970 | | |
| 22 | −10.52200 | 0.50000 | 1.77250 | 49.6 |
| 23 | 388.17750 | 3.20460 | 1.74950 | 35.0 |
| 24 | −12.12240 | Variable | | |
| 25 | 23.04370 | 5.03410 | 1.50670 | 70.5 |
| 26* | −317.40170 | (BF) | | |
| Image surface | ∞ | | | |

TABLE 14

(Aspherical data)

Surface No. 4

K = 0.00000E+00, A4 = 1.71813E−06, A6 = −7.27512E−10,
A8 = 0.00000E+00 A10 = 0.00000E+00

Surface No. 7

K = 0.00000E+00, A4 = 7.08869E−06, A6 = −1.79352E−07,
A8 = 2.99404E−09 A10 = −2.30427E−11

Surface No. 15

K = 0.00000E+00, A4 = 8.05746E−05, A6 = 2.31496E−07,
A8 = −7.31615E−10 A10 = 3.44991E−11

Surface No. 17

K = 0.00000E+00, A4 = −8.15426E−06, A6 = 2.32780E−07,
A8 = −1.20133E−08 A10 = 2.22536E−10

Surface No. 26

K = 0.00000E+00, A4 = 7.79328E−06, A6 = −5.20215E−08,
A8 = 3.54045E−11 A10 = 3.28593E−13

TABLE 15

(Various data in an infinity in-focus condition)
Zooming ratio 4.70881

| | Wide-angle limit | Middle position | Telephoto limit |
|---|---|---|---|
| Focal length | 17.5101 | 37.9940 | 82.4515 |
| F-number | 3.60541 | 4.94459 | 5.76831 |
| Half view angle | 34.9530 | 15.4671 | 7.1450 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.2321 | 27.2073 |
| d10 | 27.1147 | 11.8628 | 1.0000 |
| d15 | 1.6593 | 2.6791 | 1.5666 |
| d19 | 3.1000 | 7.3339 | 11.9603 |
| d24 | 16.2874 | 12.0534 | 7.4275 |

TABLE 16

(Zoom lens unit data)

| Lens unit | Initial surface No. | Focal length |
|---|---|---|
| 1 | 1 | 62.12776 |
| 2 | 5 | −12.74152 |
| 3 | 11 | 26.41511 |
| 4 | 16 | 26.61438 |
| 5 | 20 | −20.48018 |
| 6 | 25 | 42.61196 |

The following Table 17 shows the corresponding values to the individual conditions in the zoom lens systems of each of Numerical Examples.

TABLE 17

(Values corresponding to conditions)

| | | Numerical Example | | | |
|---|---|---|---|---|---|
| Condition | | 1 | 2 | 3 | 4 |
| (1) | Σ(Tn)/H | 0.5745 | 0.6757 | 0.6887 | 2.0562 |
| (2) | Σ(Tn$_2$)/H | 0.1110 | 0.1388 | 0.1388 | 1.2696 |
| (3) | T$_1$/f$_W$ | 0.2568 | 0.2221 | 0.2182 | 0.5376 |

The present disclosure is applicable to, for example; a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the zoom lens system according to the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system comprising a plurality of lens units, each lens unit having at least one lens element, wherein
the plurality of lens units includes a lens unit located closest to an object side and a lens unit located closest to an image side, that are fixed with respect to an image surface in zooming from a wide-angle limit to a telephoto limit at a time of image taking, and at least three lens units among all of the plurality of lens units other than the lens unit located closest to the object side and the lens unit located closest to the image side are moving lens units that move along an optical axis in the zooming,
at least one lens unit among the moving lens units is a focusing lens unit that moves along the optical axis in focusing from an infinity in-focus condition to a close-object in-focus condition, and
the following conditions (1) and (3) are satisfied:

$$\Sigma(Tn)/H \leq 2.1 \quad (1)$$

$$0.1 \leq T_1/f_W \leq 1.5 \quad (3)$$

where
$\Sigma(Tn)$ is the total of axial thicknesses of all the moving lens units,
H is the maximum image height,
$T_1$ is an axial length from a most object side lens surface of the lens unit located closest to the object side to a most image side lens surface of the lens unit located closest to the object side, and
$f_W$ is a focal length on a d-line of the zoom lens system at a wide-angle limit.

2. The zoom lens system as claimed in claim 1, wherein
at least two lens units among the moving lens units are focusing lens units that move along the optical axis in focusing from the infinity in-focus condition to the close-object in-focus condition.

3. The zoom lens system as claimed in claim 1, wherein
at least two lens units among the moving lens units are each composed of one lens element.

4. The zoom lens system as claimed in claim 1, wherein
the following condition (2) is satisfied:

$$\Sigma(Tn_2)/H \leq 0.5 \quad (2)$$

where
$\Sigma(Tn_2)$ is the total of axial thicknesses of all the moving lens units other than a moving lens unit having the largest axial thickness, and
H is the maximum image height.

5. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

6. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

7. A zoom lens system comprising a plurality of lens units, each lens unit having at least one lens element, wherein
the plurality of lens units includes a lens unit located closest to an object side, a lens unit located closest to an image side, and a lens unit being composed of a plurality of lens elements and including an aperture diaphragm, that are fixed with respect to an image surface in zooming from a wide-angle limit to a telephoto limit at a time of image taking, and at least three lens units among all of the plurality of lens units other than the lens unit located closest to the object side, the lens unit located closest to the image side, and the lens unit being composed of the plurality of lens elements and including the aperture diaphragm are moving lens units that move along an optical axis in the zooming,
at least one lens unit among the moving lens units is a focusing lens unit that moves along the optical axis in focusing from an infinity in-focus condition to a close-object in-focus condition, and
the following conditions (1) and (2) are satisfied:

$$\Sigma(Tn)/H \leq 2.1 \quad (1)$$

$$\Sigma(Tn_2)/H \leq 0.5 \quad (2)$$

where
$\Sigma(Tn)$ is the total of axial thicknesses of all the moving lens units,
$\Sigma(Tn_2)$ is the total of axial thicknesses of all the moving lens units other than a moving lens unit having the largest axial thickness, and
H is the maximum image height.

8. The zoom lens system as claimed in claim 2, wherein
at least two lens units among the moving lens units are focusing lens units that move along the optical axis in focusing from the infinity in-focus condition to the close-object in-focus condition.

9. The zoom lens system as claimed in claim 7, wherein
at least two lens units among the moving lens units are each composed of one lens element.

10. The zoom lens system as claimed in claim 7, wherein
the following condition (3) is satisfied:

$$0.1 \leq T_1/f_W \leq 1.5 \quad (3)$$

where
$T_1$ is an axial length from a most object side lens surface of the lens unit located closest to the object side to a most image side lens surface of the lens unit located closest to the object side, and
$f_W$ is a focal length on a d-line of the zoom lens system at a wide-angle limit.

11. An interchangeable lens apparatus comprising:
the zoom lens system as claimed in claim 7; and
a lens mount section which is connectable to a camera body including an image sensor for receiving an optical image formed by the zoom lens system and converting the optical image into an electric image signal.

12. A camera system comprising:
an interchangeable lens apparatus including the zoom lens system as claimed in claim 7; and
a camera body which is detachably connected to the interchangeable lens apparatus via a camera mount section, and includes an image sensor for receiving an optical image formed by the zoom lens system and converting the optical image into an electric image signal.

* * * * *